(12) United States Patent
Calamaro

(10) Patent No.: US 8,424,590 B2
(45) Date of Patent: Apr. 23, 2013

(54) GEOTHERMAL SLEEVE FOR BUILDING STRUCTURES

(76) Inventor: Raymond Stuart Calamaro, Washington, DC (US)

( * ) Notice: Subject to any disclaimer, the term of this patent is extended or adjusted under 35 U.S.C. 154(b) by 1202 days.

(21) Appl. No.: 12/105,758

(22) Filed: Apr. 18, 2008

(65) Prior Publication Data

US 2009/0260776 A1     Oct. 22, 2009

(51) Int. Cl.
*F24J 3/08*     (2006.01)

(52) U.S. Cl.
USPC ............................... 165/45; 165/56; 165/48.1

(58) Field of Classification Search ..................... 165/45, 165/47, 53, 56, 48.1
See application file for complete search history.

(56) References Cited

U.S. PATENT DOCUMENTS

| 4,227,566 | A | * | 10/1980 | Stilber | 165/45 |
| 6,010,276 | A | | 1/2000 | Young et al. | |
| 6,568,136 | B2 | | 5/2003 | Aso | |
| 6,843,718 | B2 | * | 1/2005 | Schmitz | 454/186 |
| 2003/0207663 | A1 | * | 11/2003 | Roff | 454/186 |

FOREIGN PATENT DOCUMENTS

| JP | 60191148 | * | 9/1985 |
| JP | 3-51640 | * | 3/1991 |

* cited by examiner

*Primary Examiner* — Teresa Walberg
(74) *Attorney, Agent, or Firm* — Hogan Lovells US LLP

(57) ABSTRACT

A geothermal sleeve for a building structure keeps air at a moderate temperature by passing through a geothermal heat exchanger (e.g., pipes) located underground. The moderate air is drawn up from the underground pipes and pumped into existing spaces between the interior and exterior walls (or surfaces) of a dwelling. The moderate air fills in the spaces between the interior and exterior walls to create a geothermal sleeve to supplement climate control inside the building structure.

22 Claims, 4 Drawing Sheets

GEOTHERMAL SLEEVE FOR BUILDING STRUCTURES

FIELD OF THE INVENTION

The present invention relates generally to geothermal heat transfer and more particularly to novel structures and techniques for efficiently exchanging heat with the earth to provide supplemental heating and/or cooling in a building.

DESCRIPTION OF RELATED ART

A wide variety of factors, including the continuing consumption of non-renewable energy resources and the relatively high cost of renewable energy, continues to drive a need for more energy efficient buildings. A combination of structural design and applied energy resources can be used to reduce energy consumption, particularly as applied to climate control.

Some efforts to improve the energy efficiency of building structures have been generally directed to construction methods for incorporating a gap within the building structure for insulation or other structural purposes. For example, U.S. Pat. No. 6,010,276 discloses a construction method using two wall assemblies with a hollow intermediary cavity that is filled with cement to accomplish, among other purposes, improved energy efficiency.

It is known that heat from the earth, generally referred to as geothermal energy, can be accessed as a reliable energy source in a variety of applications. Geothermal energy can be accessed in a variety of ways, but is generally drawn from one of three broad types. Some geothermal resources can be drawn from relatively shallow ground. Other geothermal resources tap hot water and rock several miles below the Earth's surface, while still other potential uses include going even further down to tap direct heating from the earth's magma layer.

The upper 10 feet of Earth's surface generally maintains a constant temperature range between about 50° F. and 60° F. (10° C. and 16° C.). Given the beneficial potential of geothermal energy, there are a wide variety of efforts to successfully harness this resource. For example, a typical geothermal heat pump system uses pipes buried in the shallow ground near the building, a heat exchanger, and ductwork into the building. In relatively cooler periods, heat from the relatively warmer ground goes through the heat exchanger into the building. In relatively warmer periods, hot air from the building is pulled through the heat exchanger into the relatively cooler ground.

A number of other efforts have been generally directed towards methods for convection of subterranean thermal energy directly to and from a building. For example, U.S. Pat. No. 6,568,136 describes an improved gravel-bed air conditioning system in which a building contains a cement structure that is positioned proximately to but separated by gravel fill from a second cement structure positioned within the ground to encourage heat convection between the building and the surrounding ground through the two cement layers.

In still other uses of geothermal energy, hot water near the earth's surface has been piped into buildings and used as a heat source.

These and other used of geothermal energy have provided some advantages, further implementation of geothermal energy has been prevented by high costs of implementing the technology and the structural disruption required for possible retrofits.

Thus, while the aforementioned approaches to energy efficient climate control have generally provided benefits, there remains a need in the art for effectively combining efficient structural designs with uses for geothermal energy. Specifically, there remains a need for a method of construction and building system that incorporates the use of subterranean energy to improve the performance of an insulation gap in a low-cost, low impact manner.

SUMMARY OF THE INVENTION

In response to the aforementioned and other needs, embodiments of the present provide a geothermal sleeve ("green sleeve") for building construction. Generally, in certain embodiments, air is kept at a moderated temperature by passing through pipes that are underground. The underground pipes serve as a heat exchanger, and the pipes may include a variety of heat exchanging equipment and configurations that allow heat transfer with the ground to occur more effectively to moderate the temperature of the air. The moderate air is drawn up from the underground pipes and pumped into existing spaces between the interior and exterior walls (or surfaces) of a dwelling. The moderate air fills in the spaces between the interior and exterior walls to create a geothermal sleeve to supplement climate control inside the building structure and to insulate the interior living space from the environment outside of the building structure.

In certain other embodiments, a building is built with a reasonably well-insulated gap between the interior walls and the exterior walls, and that gap is kept at a moderated temperature by drawing up air from pipes that are underground, particularly from soil at a certain depth underground so that the green sleeve could bring the temperature in the air gap to that approaching the underground temperature.

In one embodiment of the invention, a building structure is provided for supplying geothermal heat transfer to supplement climate control inside the building structure. The building structure includes an exterior surface and an interior surface. The interior and exterior surface may be insulated and are positioned so that a substantially continuous gap is formed between the interior surface and the exterior surface. The building structure also includes a subsurface heat exchanger in fluid communication with said gap and a circulating system for circulating air through the heat exchanger and the gap to allow the air temperature in the gap to approach that of the subsurface temperature in the area around the heat exchanger.

The gap formed by the interior and exterior surfaces substantially surrounds the interior dwelling area, with the exception of access areas between the interior and exterior walls as necessary for, e.g., doors, windows and conduits. In certain embodiments, the heat exchanger, the circulating system, and the gap form a closed-loop, such that the air in the gap does not enter the dwelling area or the exterior atmosphere.

In another embodiment of the invention a method of cooling and heating a building structure using geothermal heat transfer is provided. The method includes the steps of providing an insulated gap between an interior wall and an exterior wall of a building structure and providing a subsurface heat exchanger in fluid communication with the insulated gap. Another step includes circulating air through the heat exchanger and the insulated gap to allow the air temperature in the insulated gap to approach the subsurface temperature. The insulated gap provides a generally consistent temperature around the interior dwelling that can supplement conventional heating and cooling methods.

BRIEF DESCRIPTION OF THE DRAWINGS

A more complete understanding of the present invention and advantages thereof may be acquired by referring to the FIG. 1 provides schematic of a cross-section of a building structure using geothermal air to create a geothermal sleeve in accordance with an embodiment of the present invention.

DETAILED DESCRIPTION OF THE PREFERRED EMBODIMENTS

As depicted in the figures and as described herein, the present invention provides improved structures and techniques for efficiently exchanging heat with the earth to provide supplemental heating and/or cooling in a building.

Figure 1:
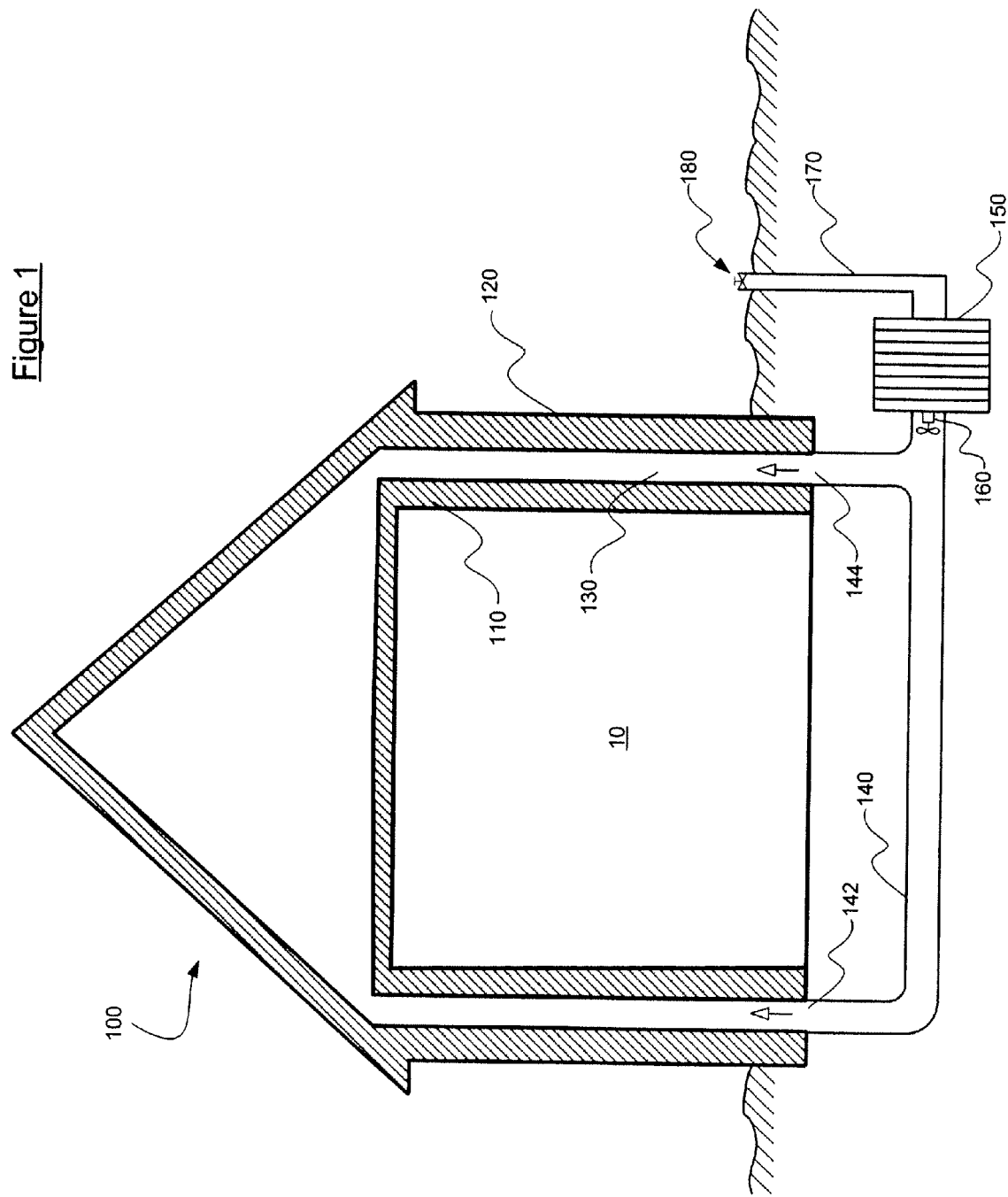

FIG. 1 provides schematic of a cross-section of a building structure using geothermal air to create a geothermal sleeve in accordance with an embodiment of the present invention. In the building structure 100 a set of conventional interior walls 110 is provided defining an interior space 10. The set of interior walls 110 may, preferably, include a roof/ceiling structure. The interior wall may be drywall, paneling or other conventional interior materials that may be mounted on conventional framing (not shown), such as wood, steel, or aluminum framing. An exterior wall 120 is provided that defines the outside of the dwelling. A gap or space 130 exists within the framing between the interior wall 110 and the exterior wall 120. The gap 130 may be partially filled by insulating materials (for one or both of the interior and exterior walls), wires, piping, conduits, and the like as typical in conventional construction. However, sufficient space should exist to allow air-flow within the gap 130.

Air is fed into the air gap 130 at various locations from pipes 140. Although only two entry points (142, 144) are shown in the cross-section of FIG. 1, it should be understood that multiple entry points into the air gap 130 may be used. Furthermore, entry points may be included at multiple elevations within the air gap 130 to accommodate, for example, interruptions in the air gap due to floor structures or windows or other objects that may interrupt the continuity of the air gap 130.

The pipes 140 may also be in fluid communication with a heat exchanger 150 located below the Earth's surface at a depth that generally maintains a constant temperature range, preferably between about 50° F. and 60° F. (10° C. and 16° C.). For clarity, as used in this application, the term "heat exchanger" may refer to any of a variety of heat exchanging equipment and configurations, including a simple series of underground pipes, that allow heat transfer with the ground to occur to moderate the temperature of the air.

The pipes 140 may be fed with external air from additional conduits or pipes 170 that allow access to outside air through valve 180. The air is drawn in an circulated into the air gap 130 using an air circulation system 160. The embodiment of FIG. 1 is an open loop system. Air that enters from valve 180 and is moderated by geothermal heat transfer underground enters the gap 130 from one of the entry points (142, 144) of the pipes 140, then exits the gap 130 at various locations through losses in the interior walls 110 or exterior walls 120.

Figure 2:
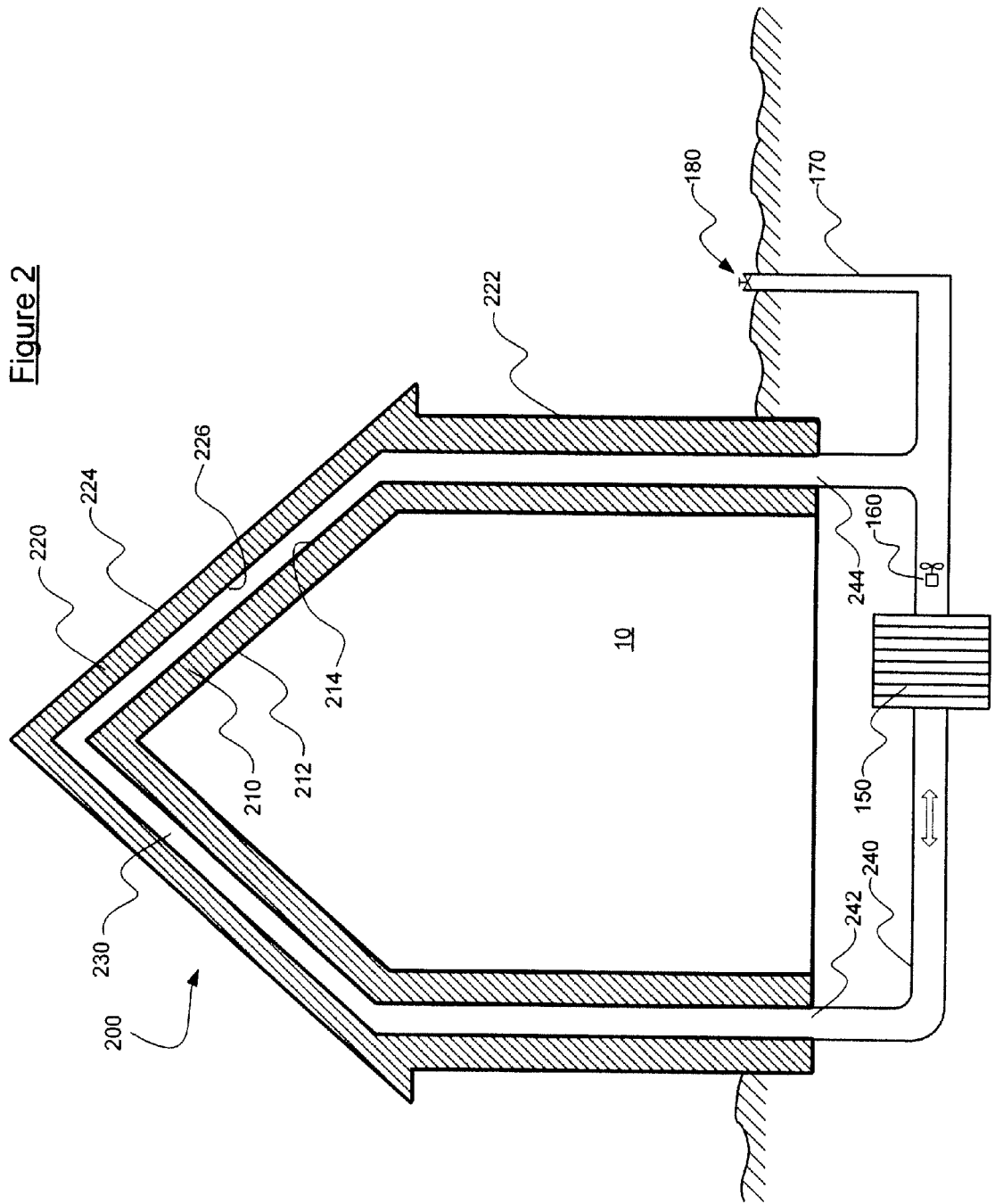
FIG. 2 provides a schematic of a cross-section of geothermal building structure in accordance with an embodiment of the present invention.

Turning now to FIG. 2, a cross section of a building structure 200 is provided for supplying geothermal heat transfer to supplement climate control inside the building structure according to an embodiment of the invention. In the building structure 200 an internal wall 210 is provided defining an interior space 10. The internal wall 210 may be a single wall or a series of walls and may, preferably, include a roof/ceiling structure. An external wall 220 is provided that substantially surrounds at least a portion of the internal wall 210; but external wall 220 is set a small distance apart (e.g., about 1 to 5 inches) from the internal wall 210, so as to form a gap 230.

The internal wall 210 may generally be constructed in a conventional manner using known materials. For example, wood or steel framing may be covered by drywall to form an interior surface 212 of the internal wall 210. On the outside surface 214 of internal wall 210, a surface material sufficient to substantially seal the air in gap 230 from the interior space 10 is used. For example, metal flashing, TYVEK® sheets, painted plywood, or a variety of other materials may be used. In other embodiments, the gap 230 may not be sealed by anything other than the conventional materials forming the internal wall 210.

The external wall 220 may generally be in a conventional manner using known materials. For example, wood or steel framing may be used, covered by plywood and a conventional exterior facing, such as brick, metal siding, vinyl siding, and the like to form an exterior surface 222 for at least a portion of the external wall 220. Similarly, external wall 220 may include an exterior roof portion 224 that may be covered by conventional roofing materials, such as metal or shingles. An interior surface 226 of the external wall 220 will generally be sealed (or insulated) with the same material as that of the outside surface 214 of internal wall 210 discussed above.

Figure 4:
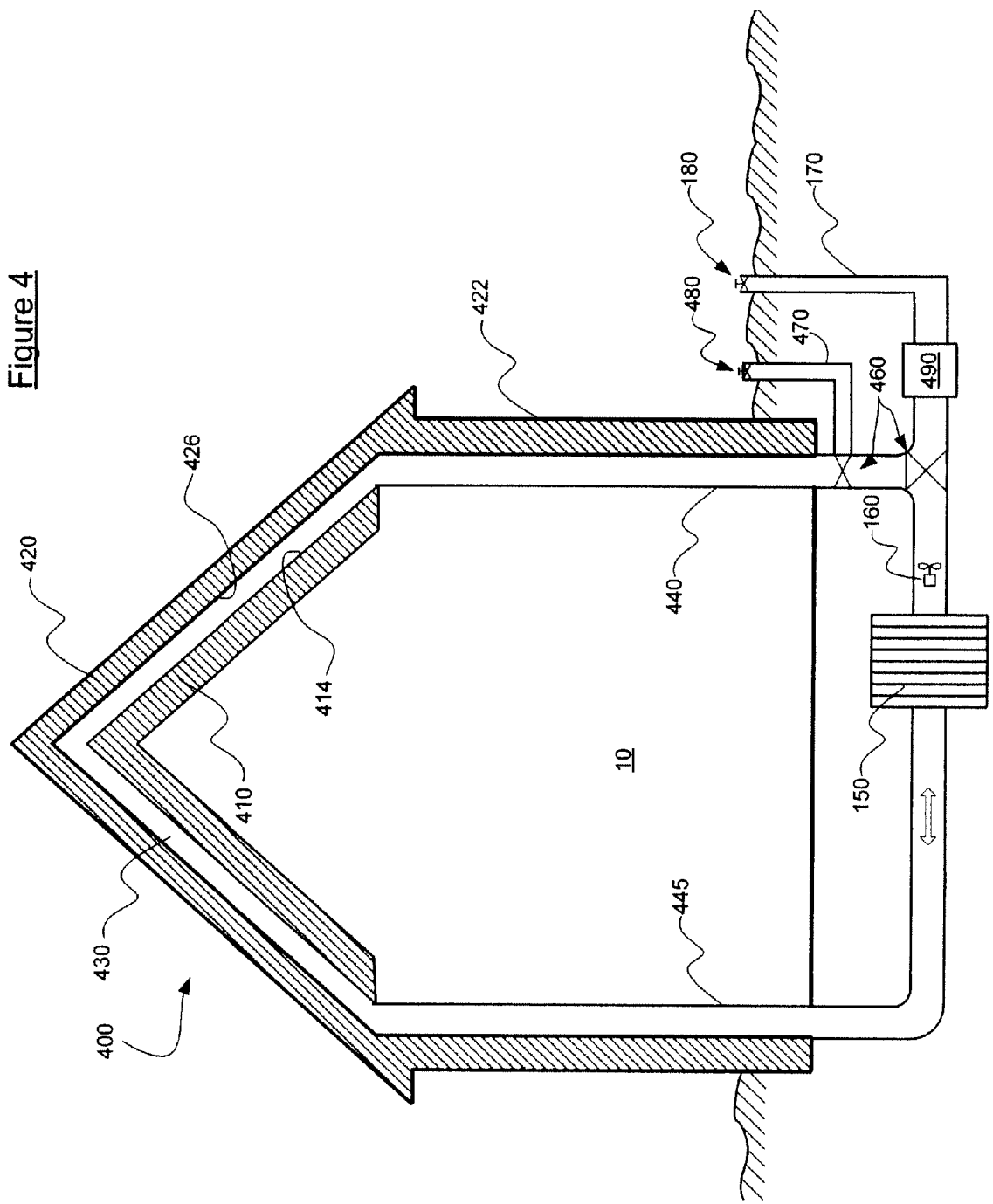
FIG. 4 provides a cross-section schematic of a retrofit geothermal building structure in accordance with an embodiment of the present invention.

The gap 230 is a continuous space between the internal wall 210 and the external wall 220, so that air (or another fluid) can be circulated throughout the gap 230. However, pass-through points (not shown) and structural supports may interrupt portions of the air gap 230 where the interior wall 210 and the exterior wall 220 must be connected to provide for access to the building structure, such as doors, windows, electrical conduits and the like. The air gap 230 between the internal wall 210 and the external wall 220 may be formed around the entire internal wall 210 or only a portion thereof. For example, in certain retrofit construction it may be desirable to create an air gap for two walls, or, as shown in FIG. 4 to be discussed later, only the roof.

Still referring to FIG. 2, the air gap 230, through a series of conduits or pipes 240, is in fluid communication with a heat exchanger 150 located below the Earth's surface at a depth that generally maintains a constant temperature range, preferably between about 50° F. and 60° F. (10° C. and 16° C.). An air circulation system 160, which may include a series of fans, forces air through the heat exchanger 150 and throughout the air gap 230. Additional conduits or pipes 170 may be included to allow access to outside air through a opening valve 180. The heat exchanger 150 may be of a conventional type known to those skilled in the art, such that the temperature of the air cycled from the gap 230 is restored to approximately the same temperature of the subterranean depth where the heat exchanger is located.

It should be understood to one of skill in the art that the schematic of FIG. 2 is not limited to the particular arrangement shown. For example, while the pipes 240 are shown connecting to the air gap 230 at only two junction points 242, 244, numerous junction points may be used to provide adequate circulation. Also, heat exchanger 150 would generally not be located directly below the building structure, but may be off-set from the building structure as is known in the art.

Figure 3:
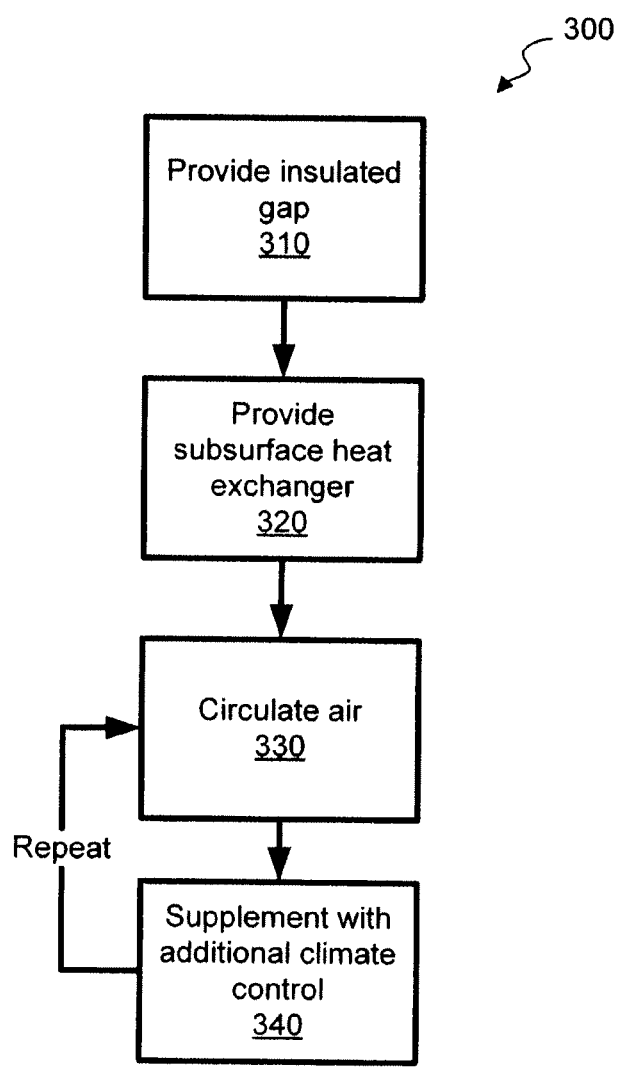
FIG. 3 provides a flow chart of a method of cooling or heating a structure in accordance with an embodiment of the invention.

Referring now to FIG. 3, a method of cooling and heating a building structure is shown. The method 300, includes first the step 310 of proving an insulated air gap in a building structure. The air gap may be formed as part of a new building construction or, in certain embodiments, the air gap may be created inside or outside the walls of an existing structure. The insulated air gap may have a generally sealed boundary such that air in the insulated gap exits substantially only through outlet piping leading from the gap and that air enters substantially only through inlet piping leading into the gap.

Next in step 320, a subsurface heat exchanger is provided. The heat exchanger is located below the Earth's surface at a depth that generally maintains a constant temperature range. The heat exchanger is installed to be in fluid communication with the air gap created in step 210. More specifically, piping or ductwork is provided to allow air to pass from the heat exchanger to the air gap.

In step 330, air in the gap is circulated through the heat exchanger. The circulation process is generally accomplished through use of one or more blowers to force air in a closed loop through the gap and back to the heat exchanger. During this circulation, depending on the external temperature and internal dwelling conditions, either (a) heat from relatively warmer ground goes through the heat exchanger and is circulated back into the gap in the building or (b) warmer air from the gap is pulled through the heat exchanger into the relatively cooler ground. Optionally, in step 240, climate control (e.g., heat or air conditioning) for the dwelling area (i.e., space 10) of the building structure is supplemented through conventional techniques.

Referring now to FIG. 4, a cross-section schematic of a retrofit geothermal building structure 400 is provided. In the building structure 400 an existing external structure 420 is provided defining an interior space 10. In a retrofit application, an internal wall 410 is provided that extends substantially along at least an interior portion of the external wall 420; but internal wall 410 is set a distance apart from the external wall 420, so as to form a gap 430. The gap 430 may have a generally sealed boundary such that air in the gap 430 exits substantially only through outlet piping 440 leading from the gap 430 and that air enters substantially only through inlet piping 445 leading into the gap 430. The outlet piping 440 and inlet piping 445 is added to the existing structure and may be retrofit externally to the structure, or, preferably internal to the structure, as shown in FIG. 4.

The internal wall 410 may generally be constructed in a conventional manner using known materials. For example, in the embodiment of FIG. 4 if existing rafters are accessible, plywood, Styrofoam, or drywall sheets may be used to form the internal wall 410. On the outside surface 414 of internal wall 410, a surface material sufficient to substantially seal the air in gap 430 from the interior space 10 is used, such as those materials discussed above with respect to FIG. 2. In certain embodiments, the internal wall 410 may advantageously be configured as the floor of an attic space, such that the air gap 430 would encompass the area of a traditional attic space.

The existing external structure 420 that correlates with the internal wall 410 to form gap 430 may also be sealed to allow a substantially closed-loop flow. An interior surface 426 of the external structure 420 may modified to generally be of the same material as that of the outside surface 414 of internal wall 410 discussed above. However, it should be understood that embodiments of the invention can be practiced without either interior surface 426 or outside surface 414 being sealed.

Similar to the embodiment of FIG. 2, the gap 430 in FIG. 4 is a substantially continuous space between the internal wall 410 and the external wall 420, so that air (or other fluids) can be circulated throughout the gap 430. Pass-through points (not shown) may interrupt portions of the air gap 430 where the interior wall 410 and the exterior wall 420 must be connected to provide vents, widows, or the like for the building structure.

As with the embodiment of FIG. 2, the air gap 430 of FIG. 4 via exit pipes 340 and inlet pipes 445 is in fluid communication with a heat exchanger 150 located below the Earth's surface at a depth that generally maintains a constant temperature range. An air circulation system 160, which may include a series of fans, forces air through (or draws air from) the heat exchanger 150 and through inlet pipes 445 to the air gap 430. Additional conduits or pipes 170, 470 and valves 480 and 180 may be included to allow access to outside air. The valves 180, 460, and 480 can be configured to allow the circulation system to work as either a closed-loop or open-loop system.

Still referring to FIG. 4, an optional dehumidifier 490 or other air conditioning unit may be included to remove condensation from either the air within the gap 130 or air entering through opening 180. Additionally, air filtration components (not shown) may be included. The optional dehumidifier 390 and air filtration components may also be used in new construction configurations, such as that shown in FIG. 2.

It should be understood to one of skill in the art that the schematic of FIG. 4 is not limited to the particular arrangement shown, but is representative of a wide variety or arrangements that can be retrofit into existing building structures.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as to be later defined by the claims and their equivalents.

The invention claimed is:

1. A building structure configured to use geothermal heat transfer to supplement climate control inside the building structure, said building structure comprising:
   an exterior wall;
   an interior wall defining at least a portion of a dwelling area, wherein the interior wall and exterior wall are positioned so that a substantially continuous gap is formed between the interior wall and the exterior wall, wherein the interior wall includes a roof structure adjacent to the external roof structure,
   a subsurface heat exchanger in fluid communication with said gap; and
   a circulating system for circulating air through the heat exchanger and gap to allow the air temperature in the gap to approach that of the subsurface temperature in the area around the heat exchanger, wherein the circulating system is located adjacent to the heat exchanger and wherein the circulating system and the gap form a loop such that the air in the gap does not enter the dwelling area and is not recirculated once it enters the gap.

2. The building structure of claim 1, wherein the gap between the walls is insulated on at least one surface of one of said walls.

3. The building structure of claim 2, wherein an interior surface of the exterior wall and an exterior surface of said interior wall are insulated.

4. The building structure of claim 1, wherein the circulating system and the gap form a closed-loop.

5. The building structure of claim 1, further comprising an air conditioner in fluid communication with said gap and said heat exchanger.

6. The building structure of claim 1, further comprising a plurality of conduits with a plurality of entry points into the gap to provide fluid communication between the heat exchanger and the gap.

7. The building structure of claim 1, further comprising an air inlet in fluid communication with said heat exchanger.

8. The building structure of claim 1, further comprising outlet piping leading from the gap and inlet piping leading into the gap, wherein the gap has a substantially sealed boundary such that air in the gap exits substantially through said outlet piping and air enters substantially through said inlet piping.

9. The building structure of claim 1, further comprising inlet piping leading into the gap, wherein air that enters the gap from the inlet piping exits the gap at a plurality of locations through losses in the interior wall or exterior wall.

10. A method of cooling and heating a building structure using geothermal heat transfer comprising the steps of:
retrofitting an existing building structure to add an air gap, wherein said gap is formed by adding an internal wall that extends along at least one interior portion of an existing external wall, and wherein said internal wall is set a distance apart from said external wall;
providing a subsurface heat exchanger in fluid communication with the gap; and
circulating air through the heat exchanger and the gap to allow the air temperature in the gap to approach the subsurface temperature, wherein a circulation system located adjacent to the heat exchanger feeds air into the the gap.

11. The method of claim 10, wherein retrofitting an existing building further comprising the step of adding outlet piping leading from the gap and inlet piping leading into the gap to the existing structure, wherein air in the gap exits substantially through said outlet piping and air enters substantially through said inlet piping.

12. The method of claim 10, wherein retrofitting an existing building further comprising the step of adding inlet piping leading into the gap to the existing structure, wherein air that enters the gap from the inlet piping exits the gap at a plurality of locations through losses in the interior wall or exterior wall.

13. The method of claim 10, wherein the gap between the walls is insulated on at least one surface of one of said walls.

14. The method of claim 13, wherein an interior surface of the exterior wall and an exterior surface of said interior wall are insulated.

15. The method of claim 10, wherein the circulating system and the gap form a closed-loop, such that the air in the gap does not enter a dwelling area substantially defined by said inner wall.

16. The method of claim 10, further comprising the step of providing a plurality of conduits in fluid communication with the heat exchanger and the gap via a plurality of entry points into the gap.

17. The method of claim 10, further comprising the step of providing an air inlet in fluid communication with said heat exchanger.

18. The method of claim 10, further comprising the step of providing an air outlet in fluid communication with said gap.

19. The method of claim 10, wherein retrofitting an existing structure to add said air gap comprises forming said gap in the attic space of an existing building structure.

20. A system for supplementing climate control inside a building, said system comprising a building structure having an air-filled gap between an existing external wall and a retrofitted internal wall, wherein the retrofitted internal wall is added to the existing structure at a set distance from the existing external wall, and a subterranean geothermal heat exchanger, wherein the circulating system and gap form a closed-loop system such that air in the gap does not enter a dwelling area substantially defined by said internal wall, wherein air in the air-filled gap is kept at a moderate temperature by passing through said heat exchanger and wherein moderate air is drawn up from said heat exchanger and pumped into the air-filled gap to create a geothermal sleeve to supplement climate control inside the building.

21. The system of claim 1, wherein the air gap is provided only around the periphery of the internal walls, ceiling, and floor of the building structure in order to create an air gap sleeve around the building structure, and wherein the gaps does not extend into the interior of the building structure.

22. The method of claim 10, further comprising feeding the gap with air using the circulation system located adjacent to the heat exchanger, and allowing the air fed into the gap to naturally distribute throughout the gap without recirculating the air within the gap.

* * * * *